US008312194B2

(12) United States Patent
Scoredos

(10) Patent No.: US 8,312,194 B2
(45) Date of Patent: Nov. 13, 2012

(54) METHOD AND APPARATUS FOR VALIDATION OF CONTINUOUS ACCESS TO A DATA STRUCTURE

(75) Inventor: Eric C. Scoredos, Boulder Creek, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1445 days.

(21) Appl. No.: 11/240,256

(22) Filed: Sep. 30, 2005

(65) Prior Publication Data

US 2007/0079037 A1 Apr. 5, 2007

(51) Int. Cl.
*G06F 12/00* (2006.01)

(52) U.S. Cl. ........................................ 710/200; 710/240

(58) Field of Classification Search .................. 710/200, 710/240–244; 711/144, 146; 707/8
See application file for complete search history.

(56) References Cited

U.S. PATENT DOCUMENTS

| 6,141,734 | A | * | 10/2000 | Razdan et al. | 711/144 |
| 6,694,409 | B2 | * | 2/2004 | Chang | 711/141 |
| 2006/0218556 | A1 | * | 9/2006 | Nemirovsky et al. | 718/104 |
| 2006/0242644 | A1 | * | 10/2006 | Blue | 718/100 |

* cited by examiner

*Primary Examiner* — Tim T Vo
*Assistant Examiner* — Kim Huynh

(57) ABSTRACT

Method and apparatus for enabling continuous validation of a data structure by acquiring a first read lock for the data structure and processing the data structure under the first read lock. When the first read lock is relinquished and subsequently reacquired, the method provides for determining if a write lock was granted prior to reacquiring the first read lock. The data structure is further processed when a write lock was not granted and is revalidated when a write lock was granted.

20 Claims, 7 Drawing Sheets

METHOD AND APPARATUS FOR VALIDATION OF CONTINUOUS ACCESS TO A DATA STRUCTURE

BACKGROUND

In a multi-processor system, data is shared through the use of special data structures that have associated with them a read/write lock mechanism. The read/write lock mechanism, in traditional terms, is used to prevent one process from modifying data in the data structure during a period of time when a second process is relying upon the integrity of the data in the same data structure. Typically, a first processing thread will acquire a read lock before it accesses data stored in the data structure. So long as the first processing thread continues to hold the read lock, a second process will be prevented from acquiring a write lock. In fact, a write lock is only granted to a process when there are no read locks outstanding. This prevents a second process from modifying data stored in the data structure while a first process holds a read lock. This process is especially important in a multi-processor system where a data structure is copied into a local cache memory. Since the data structure is copied into a local cache memory, it is important not to modify the original copy of the data structure so long as a read lock is held by the first process. This ensures that the original copy of the data structure remains consistent with the local cache copy of the data structure. It should be appreciated that the original copy of the data structure is typically maintained in a main memory or in some other form of computer readable medium, for example a hard drive.

It should be appreciated that many applications rely on extremely large data structures. In the case where an extremely large data structure is copied into a local cache memory, a first process must be able to rely on the consistency of the data stored in the data structure vis-à-vis the original copy of the data structure. When the first process needs to be suspended so as to allow other applications to run, the first process may need to relinquish its original read lock. Up until now, there has been no way to determine whether or not a different process has acquired an intervening write lock when the first process reacquires a read-lock to the data structure to continue processing. An intervening write lock can be considered to be a write lock that is granted to yet a second process in between the time where the first process relinquishes its original read lock and the time when the first process has been granted another read lock for the same data structure. Because the first process cannot determine whether or not an intervening write lock was granted, the first process must assume its local cache copy of the data structure is inconsistent with the original copy of the data structure. This means that the first process must revalidate the entire data structure. Typically, this means that the first process must refresh its local cache copy of the data structure. This is accomplished by reloading a fresh copy of the data structure back into the local cache memory used by the first process. Hence, any processing that was accomplished prior to relinquishing the first read lock must be undertaken a new.

BRIEF DESCRIPTION OF THE DRAWINGS

Several alternative embodiments will hereinafter be described in conjunction with the appended drawings and figures, wherein like numerals denote like elements, and in which.

DETAILED DESCRIPTION

Figure 1:
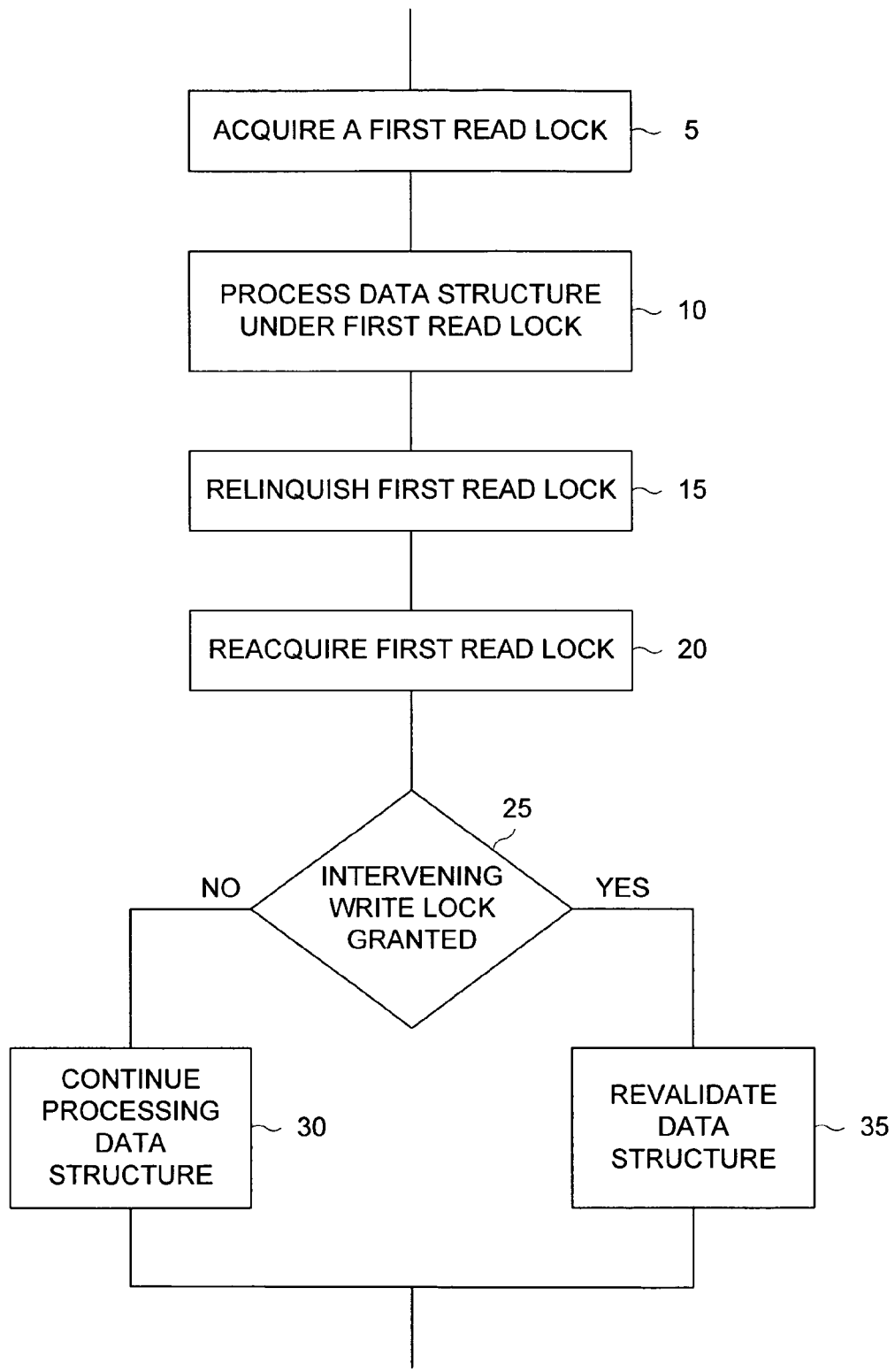
FIG. 1 is a flow diagram that depicts one example method for validating continuous access to a data structure.

FIG. 1 is a flow diagram that depicts one example method for validating continuous access to a data structure. According to this example method, a first process is able to validate continuous access to a data structure by acquiring a first read lock (step 5). The first process processes data that is included in the data structure by continuing to hold the first read lock (step 10). In accordance with this example method, the first process may need to relinquish the first read lock in order to allow other processes to run. As such, the first read lock is relinquished by the first process (step 15). At some point subsequent to relinquishing the first read lock, the first process will reacquire the first read lock (step 20). The first process then needs to determine whether an intervening write lock was granted (step 25). In the event that an intervening write lock was granted, the first process must assume that the data stored in the data structure has been modified. Accordingly, the data structure needs to be revalidated (step 35). In the event that an intervening write lock was not granted, the first process can continue processing the data structure (step 30). It should be appreciated that this process is useful in those situations where the data structure is large and includes data referencing facilities. One example of a data structure that includes data referencing facilities is a linked list. In a linked list, references to elements within the data structure are often modified as elements are added or removed to the data structure. As such, any processing that was accomplished prior to relinquishing the read lock can no longer continue because the data references included in the data structure can no longer he relied upon by the first process to access data stored in the data structure and the data structure can no longer be consistently navigated. As such, a new copy of the data structure must be reloaded into a local cache memory used by the first process to store a copy of the data structure.

Figure 2:
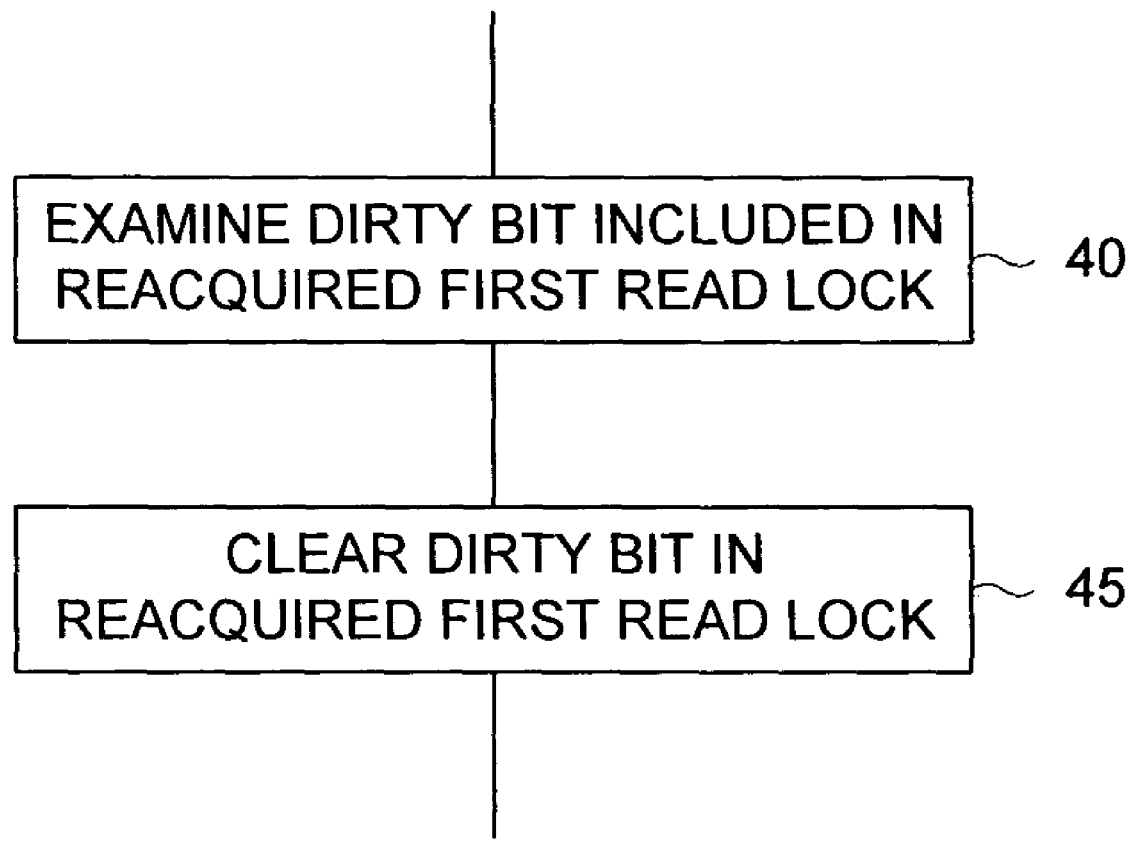
FIG. 2 is a flow diagram that depicts one example method for determining when an intervening write lock has been granted.

FIG. 2 is a flow diagram that depicts one example method for determining when an intervening write lock has been granted. According to this example variation of the present method, a first process determines whether or not an intervening write lock was granted by examining a dirty bit included in a reacquired first read lock (step 40). It should be appreciated that the the dirty bit is included in the reacquired first read lock and not in the data structure itself. In the situation where a dirty bit is included in the data structure itself, there is no method for determining the status of the dirty bit in the event a different process acquires a read lock. In yet another example variation of the present method, the first process will clear the dirty bit in the reacquired first read lock when the dirty bit is in fact set. By including the dirty bit in the read lock, a plurality of read locks may be granted to a plurality of processes each of which has an indicator (i.e. the dirty bit included in the read lock) as to the consistency of a local cache copy of the data structure vis-à-vis an original copy. This despite the number of processes waiting to acquire read locks to continue processing at any given time.

Figure 3:
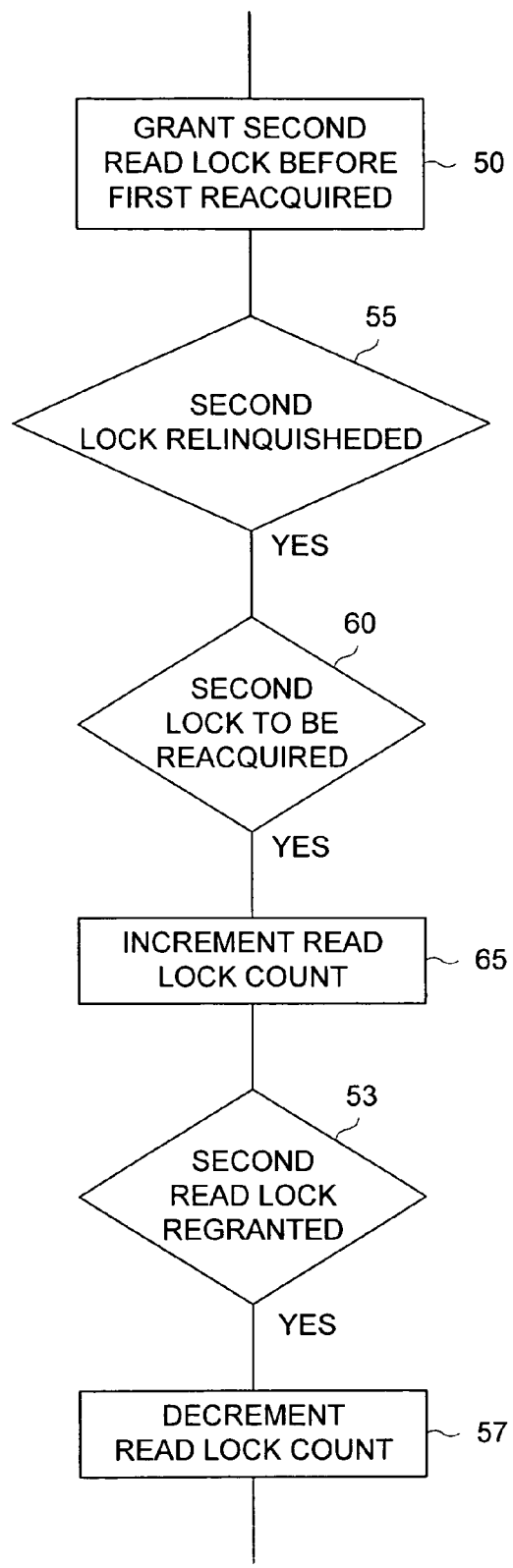
FIG. 3 is a flow diagram that illustrates yet another example variation of the present method wherein one or more secondary read locks are granted before a first process reacquires a first read lock.

FIG. 3 is a flow diagram that illustrates yet another example variation of the present method wherein one or more secondary read locks are granted before a first process reacquires a first read lock. In this variation of the present method, a second process is granted a read lock before a first read lock is reacquired by the first process (step 50). A read lock count is incremented (step 65) when the second read lock is released by a process (step 55), but still wants to reacquire the read lock (step 60) and continuing processing the data structure. When the second read lock is reacquired by the second process (step 53), the read lock count is decremented (step 57). In this manner, a running count of the number of outstanding processes awaiting regrant of read locks is maintained.

Figure 4:
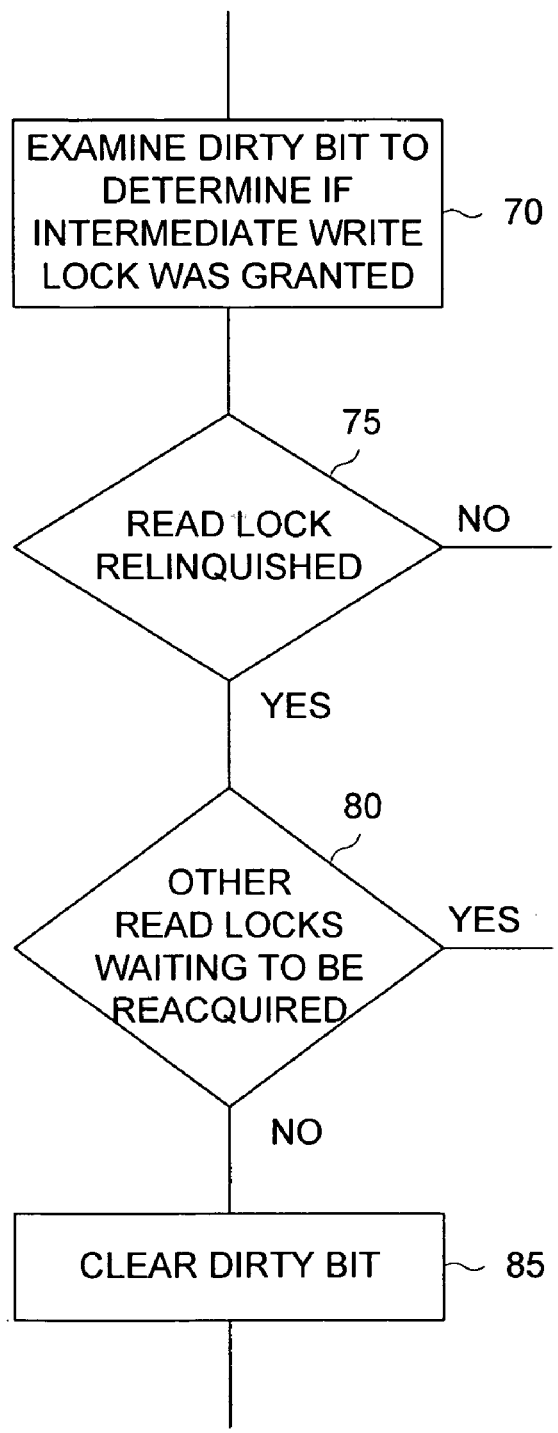
FIG. 4 is a flow diagram that depicts an example variation of the present method for clearing a dirty bit once it is used to determine if an intermediate write lock was granted.

FIG. 4 is a flow diagram that depicts an example variation of the present method for clearing a dirty bit once it is used to determine if an intermediate write lock was granted. In this example variation of the present method, a dirty bit included in a reacquired first read lock is used to determine if an intermediate write lock was granted. In order to ensure that the dirty bit is cleared only by the last process holding a read lock where there are no other processes waiting to acquire the read lock to continue processing, the dirty bit is cleared (step 85) when a read lock is relinquished by the first process (step 75) and there are no other read locks waiting to be reacquired (step 80). It should be appreciated that, according to this variation of the present method, a determination is made as to whether or not there are other read locks outstanding is made by consulting the read lock count which is maintained as heretofore described.

Figure 5:
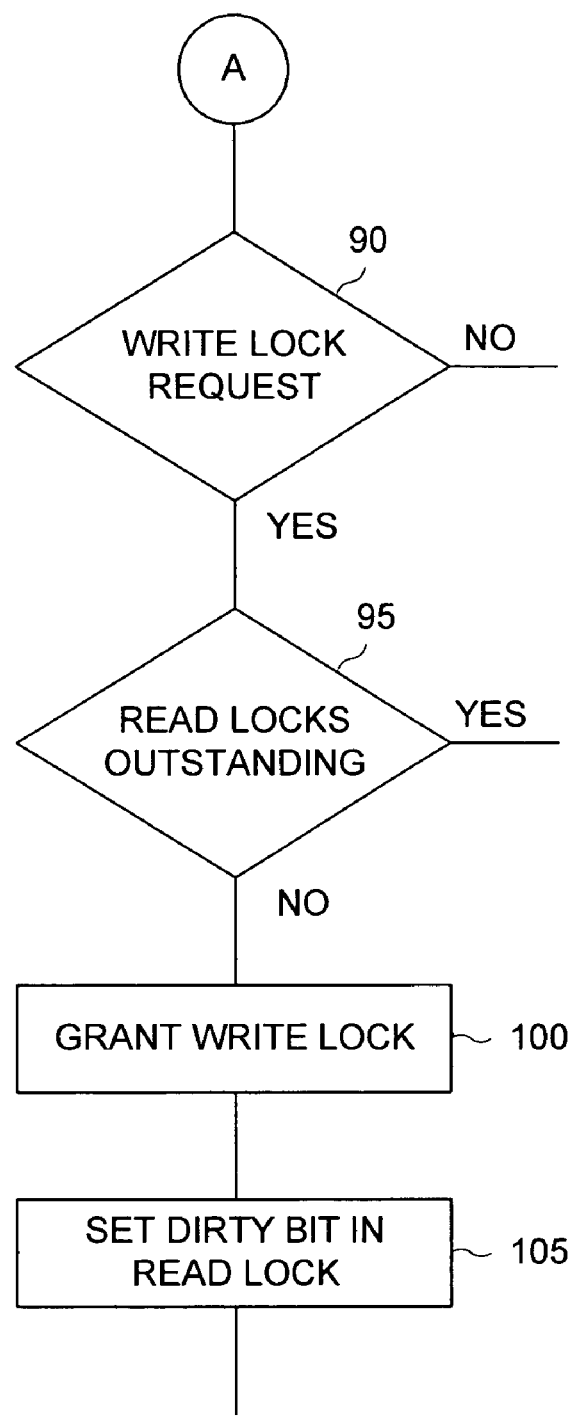
FIG. 5 is a flow diagram that depicts an example variation of the present method wherein a dirty bit is set to upon granting an intervening write lock.

FIG. 5 is a flow diagram that depicts an example variation of the present method wherein a dirty bit is set to upon granting an intervening write lock. According to this variation of the present method, when there are no other read locks outstanding (step 95) for a particular data structure, a write lock is granted (step 100) in response to receiving a write lock request (step 90). Accordingly, a dirty bit is set in a read lock (step 105). It should be appreciated that the read lock can then be reacquired by the first process or shared with other processes that need to access a local cache copy of a data structure or need access to the data structure itself.

Figure 6:
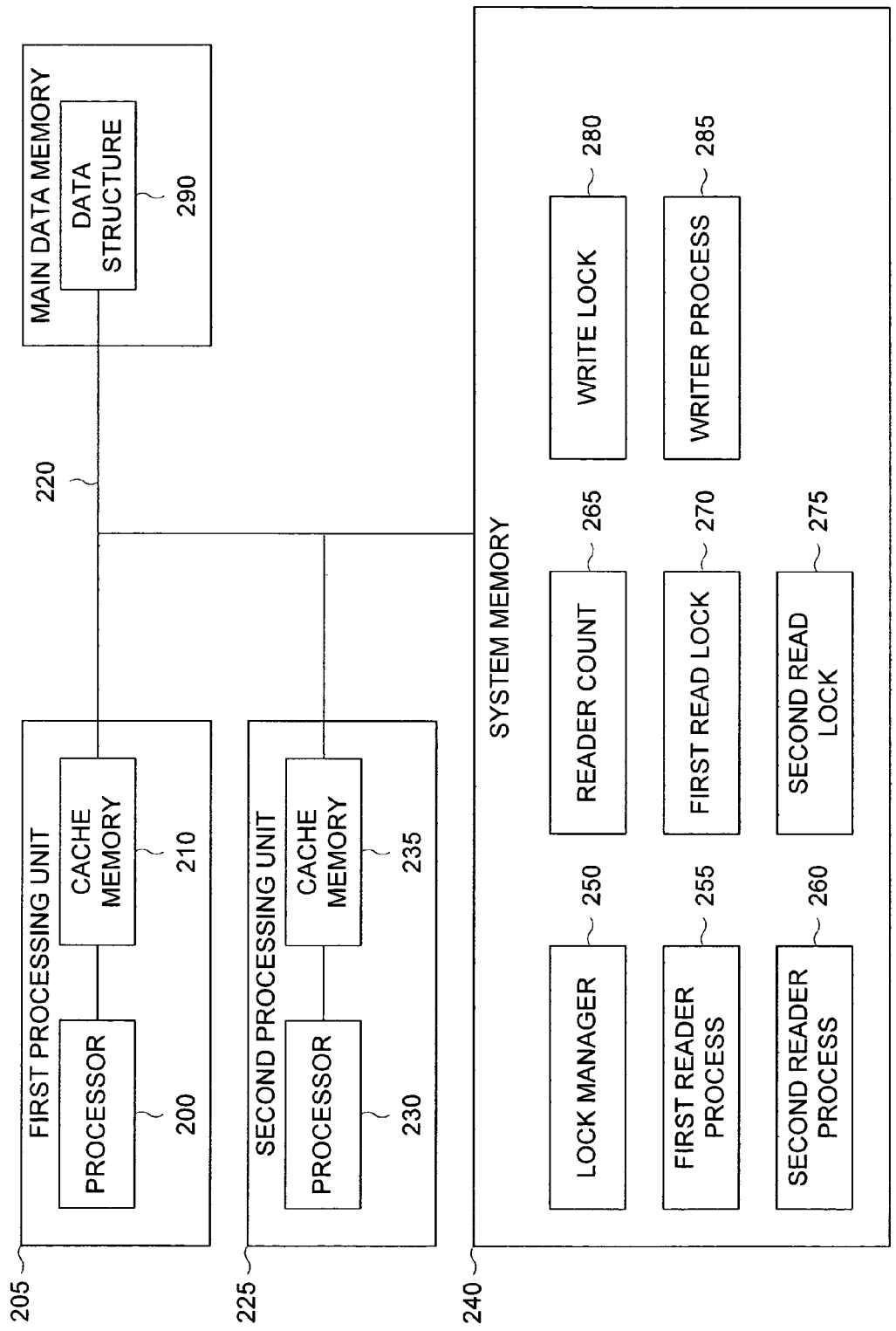
FIG. 6 is a block diagram that depicts one example embodiment of a system that enables continuous access to a data structure.

FIG. 6 is a block diagram that depicts one example embodiment of a system that enables continuous access to a data structure. According to this example embodiment, a system that enables continuous access to a data structure comprises a main data memory 215, a system memory 240, and a first processing unit 205. In this example embodiment, the first processing unit 205 includes a first process or 200 and a local cache memory 210. It should be appreciated that the local cache memory 210 is used to store a copy of the data structure 290 that is otherwise stored in the main data memory 215. It should further be appreciated that the data structure 290 stored in the main data memory 215 may be copied into a plurality of cache memories (210, 235), each of which services a corresponding processor (200, 230). It should be appreciated that a first processing unit 205 is communicatively coupled to the main data memory 215 and the system memory 240 by means of a bus 220. A second processing unit 225 is also coupled to the main data memory 215 and the system memory 240 by means of the bus 220.

This example embodiment of a system that enables continuous access to a data structure as heretofore described further includes various functional modules each of which comprises an instruction sequence that can be executed by any one of the processor (200, 230) in a multi-processor system. An instruction sequence that implements a functional module, according to one alternative embodiment, is stored in the system memory 240. The reader is advised that the term "minimally causes the processor" and variants thereof is intended to serve as an open-ended enumeration of functions performed by the processor as it executes a particular functional module (i.e. instruction sequence). As such, an embodiment where a particular functional module causes a processor to perform functions in addition to those defined in the appended claims is to be included in the scope of the claims appended hereto.

The functional modules (and their corresponding instruction sequences) described thus far that enable continuous access to a data structure are, according to one alternative embodiment, imparted onto a computer readable medium. Examples of such media include, but are not limited to, random access memory, read-only memory (ROM), Compact Disk (CD) ROM, Digital Versatile Disk (DVD), floppy disks, hard disk drives and magnetic tape. This computer readable medium, which alone or in combination can constitute a stand-alone product, can be used to convert a general-purpose computing device into a device that supports continuous access to a data structure wherein said device is capable of supporting continuous access to a data structure according to the techniques and teachings presented herein. Accordingly, the claims appended hereto are to include such computer readable medium imparted with such instruction sequences that enable execution of the present method and all of the teachings herein described.

According to one example embodiment, a system that enables continuous access to a data structure includes a first reader process 255 which is typically stored in the system memory 240. In yet another example embodiment, the system further includes a lock manager 250, which is also stored in the system memory 240. In yet another alternative example embodiment, the system further includes a second reader process 260, which is also stored in the system memory 240. Also stored in the system memory, according to yet another example embodiment, is a writer process 285. It should further be appreciated that various alternative example embodiments use the system memory 240 to store at least one of a reader count 265, a first read lock 270, a second read lock 275, and a write lock 280.

Figure 7:
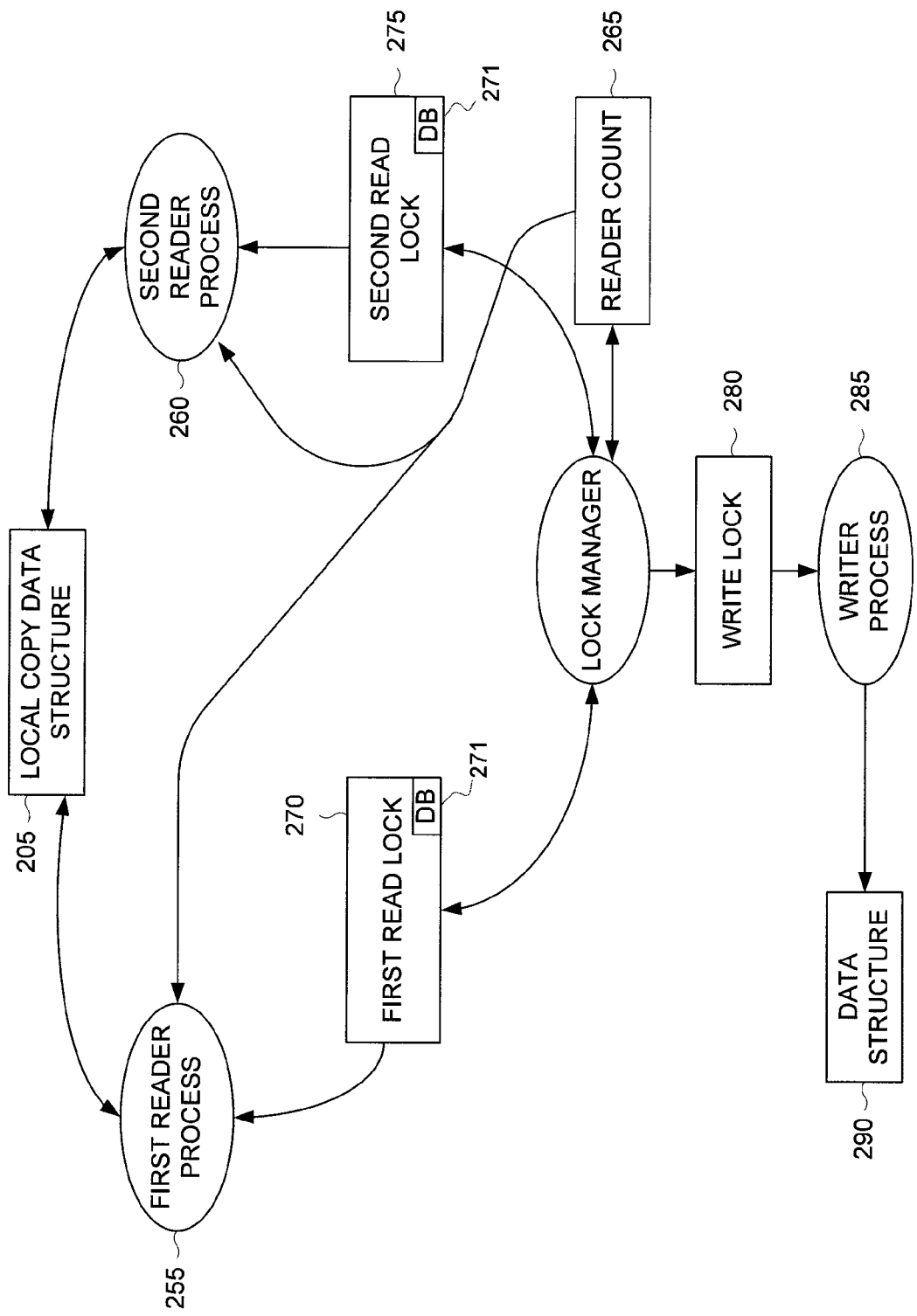
FIG. 7 is a data flow diagram that depicts the internal operation of various alternative example embodiments of a system that enables continuous access to a data structure.

FIG. 7 is a data flow diagram that depicts the internal operation of various alternative example embodiments of a system that enables continuous access to a data structure. According to one example embodiment, a processor 200 executes the first reader process 255. When executed by the processor 200, the first reader process 255 begins processing data stored in a data structure which is typically stored in the main data memory 215. In operation, the first reader process 255, when executed by the processor 200, minimally causes the processor to acquire a read lock for a data structure stored in the main data memory. Accordingly, the first reader process receives a first read lock 270. Once the processor, as it continues to execute the first reader process 255, acquires the first read lock 270, the processor 200 creates a local copy of the data structure in a corresponding first cache memory 210. The processor in this example embodiment then begins engaging in a process using the local copy of the data structure. The processor may engage in any type of application processing and the claims appended hereto are not intended to be limited to any particular application wherein the present method and embodiments thereof may be useful. At some point in time, the processor 200, as it continues to execute the first reader process 255, is further minimally caused to relinquish the first read lock before it actually completes the process in which it is engaged. Once the first read lock 270 is relinquished, the processor 200, as it continues to execute the first reader process 255, will then reacquire the first read lock at some subsequent point in time. Once the processor reacquires the first read lock 270, the processor needs to determine if an intervening write lock was granted. Based on this determination, the processor 200, as it continues to execute the first reader process 255, will continue to engage in the process which was otherwise suspended when the processor relinquished the first reader lock. The processor 200 will continue to engage in the suspended process when an intervening write lock was not granted. In the event that an intervening write lock was granted, the processor 200, as it continues to execute the first reader process 255, is further minimally caused to refresh the local copy of the data structure.

FIG. 7 further illustrates that, according to one alternative example embodiment, the first reader process 255, when executed by the processor 200, causes the processor to determine if an intervening write lock was granted by minimally causing the processor to examine a dirty bit 271, which is included in a reacquired read lock 270. In yet another alternative example embodiment, the first reader process 255 further minimally causes the processor to clear the dirty bit 271. Also included in one alternative example embodiment and stored in the system memory 240 is a lock manager 250. The lock manager 250, when executed by the processor 200, minimally causes the processor to grant a second read lock 275 to a second reader process 260. When the lock manager 250 acknowledges that the second read lock 275 has been relinquished, the lock manager 258, when executed by the processor, causes the processor to increment a read count 265 which is stored in the system memory 240. The read lock counter is only incremented when the second process indicates, during the course of relinquishing the second read lock, that it intends to reacquire the second reac lock. When the second reader process 260 subsequently reacquires the second read lock 275, the processor 200, as it continues to execute the lock manager 250, is further minimally caused to decrement the read lock count 265. In this manner, the processor keeps a running tally of the number of read locks outstanding. The number of processes that are waiting to reacquire read locks is used to in yet another alternative example embodiment of a system that enables continuous access to a data structure. In this alternative example embodiment, the processor is caused to determine if an intervening write lock was granted by examining the dirty bit 271 included in the first read lock 270. However, in this alternative example embodiment, the processor 200 is caused to clear the dirty bit when the reader count 265 indicates that there are no other read locks waiting to be reacquired. In other words, the first reader process 255 is the only reader process that is holding a valid read lock. This ensures that the last reader process that was waiting to reacquire a read lock is the only process that is allowed to clear the dirty bit 271 included in the first read lock 270. It should be appreciated that this first read lock 270 is reacquire by the first reader process 255 after the first reader process 255 relinquishes the first read lock prior to completing a process which requires continuous access to the data structure stored in the local cache, which is servicing a processor executing the first reader process 255.

In yet another alternative example embodiment, a system that enables continuous access to data structure further includes a writer process 285. In this alternative example embodiment, the lock manager 250, when executed by the processor 200, minimally causes the processor to grant a write lock 280 to the writer process 285. It will be appreciated that the processor 200 in this alternative example embodiment also sets a dirty bit 271 included in a first read lock 270 (or other read lock's granted by the lock manager 250) once a write lock 280 is granted to the writer process 285. The writer process 285 is then able to interact and modify the data structure 290 stored in the data memory 215. It should also be appreciated that the lock manager 250 of this alternative example embodiment will not allow the processor to issue a write lock 280 there are one or more read locks outstanding.

While the present method and apparatus has been described in terms of several alternative and exemplary embodiments, it is contemplated that alternatives, modifications, permutations, and equivalents thereof will become apparent to those skilled in the art upon a reading of the specification and study of the drawings. It is therefore intended that the true spirit and scope of the claims appended hereto include all such alternatives, modifications, permutations, and equivalents.

What is claimed is:

1. A method for validating continuous access to a data structure comprising:
    acquiring a first read lock for the data structure;
    processing the data structure under the first read lock;
    relinquishing the first read lock;
    reacquiring the first read lock for the data structure;
    determining if a write lock was granted prior to reacquiring the first read lock;
    continuing the processing of the data structure when a write lock was not granted; and
    revalidating the data structure when a write lock was granted.

2. The method of claim 1 wherein determining if a write lock was granted comprises examining a dirty bit included in a reacquired first read lock.

3. The method of claim 2 further comprising clearing the dirty bit included in the reacquired first read lock.

4. The method of claim 1 further comprising:
    granting a second read lock before the first read lock is reacquired;
    incrementing a read lock counter when the second read lock is relinquished and needs to be reacquired; and
    decrementing the read lock counter when the second read lock is re-granted.

5. The method of claim 4 wherein determining if a write lock was granted comprises:
    examining a dirty bit in a reacquired read lock; and
    clearing the dirty bit when the read lock is relinquished and when the read lock counter indicates that there are no other read locks waiting to be reacquired.

6. The method of claim 1 further comprising:
    granting a write lock in response to a write lock request; and
    setting a dirty bit in a read lock.

7. A system for continuous access to a data structure comprising:
    main data memory capable of storing a primary copy of a data structure;
    system memory capable of storing one or more instruction sequences and also capable of storing data;
    first processing unit comprising:
        first processor capable of executing an instruction sequence;

first cache memory capable of storing a local copy of a data structure stored in the main memory;
one or more instruction sequences stored in the system memory including:
first reader process that, when executed by the processor, minimally causes the processor to:
acquire a read lock for a data structure stored in the main data memory;
create a local copy of the data structure in the first cache memory;
engage in a process using the local copy of the data structure;
relinquish the read lock prior to completion of the engaged in process;
reacquire the read lock at a subsequent point in time;
determine if an intervening write lock was granted;
continue the engaged in process when an intervening write lock was not granted to the writer process; and
refresh the local copy of the data structure when an intervening write lock was granted.

8. The system of claim 7 wherein the first reader process causes the processor to determine if an intervening write lock was granted by minimally causing the processor to examine a dirty bit included in a reacquired read lock.

9. The system of claim 8 wherein the first reader process further minimally causes the processor to clear the dirty bit included in the reacquired read lock.

10. The system of claim 7 further comprising a lock manager stored in the system memory that, when executed by the processor, minimally causes the processor to:
grant a second read lock to a second reader process;
increment a read lock count stored in the system memory when the second read lock is relinquished but needs to be reacquired; and
decrement the read lock count stored in the system memory when the second read lock is re-granted to the second reader process.

11. The system of claim 10 wherein the first reader process causes the processor to determine if an intervening write lock was granted by minimally causing the processor to examine a dirty bit included in a reacquired read lock and further minimally causes the processor to clear the dirty bit when the reader count stored in the system memory indicates that there are no other read locks waiting to be reacquired.

12. The system of claim 7 wherein further comprising a lock manager stored in the instruction memory that, when executed by the processor, minimally causes the processor to:
grant a write lock to a writer process; and
set a dirty bit in a read lock when the write lock is granted to the writer process.

13. A computer readable medium having imparted thereon one of more instruction sequences for enabling continuous access to a data structure including:
first reader process that, when executed by a processor, minimally causes a processor to:
acquire a read lock for a data structure stored in a data memory;
create a local copy of the data structure in a local cache memory;
engage in a process using the local copy of the data structure;
relinquish the read lock prior to completion of the engaged in process;
reacquire the read lock at a subsequent point in time;
determine if an intervening write lock was granted;
continue to engaged in the process when an intervening write lock was not granted; and
refresh the local copy of the data structure when an intervening write lock was granted.

14. The computer readable medium of claim 13 wherein the first reader process causes a processor to determine if an intervening write lock was granted by minimally causing a processor to examine a dirty bit included in a reacquired read lock.

15. The computer readable medium of claim 14 wherein the first reader process further minimally causes a processor to clear a dirty bit included in a reacquired read lock.

16. The computer readable medium of claim 13 further comprising a lock manager that, when executed by a processor, minimally causes a processor to:
grant a second read lock to a second reader process; increment a read lock count stored in a memory when the second read lock is released but needs to be reacquired; and
decrement the read lock count stored in a memory when the second reader process reacquires the second read lock.

17. The computer readable medium of claim 16 wherein the first reader process causes a processor to determine if an intervening write lock was granted by minimally causing a processor to examine a dirty bit included in a reacquired read lock and further minimally causes a processor to clear the dirty bit when the reader count stored in a memory indicates that there are no other read locks waiting to be reacquired.

18. The computer readable medium of claim 7 wherein further comprising a lock manager that, when executed by a processor, minimally causes a processor to:
grant a write lock to a writer process; and
set a dirty bit in a read lock when the write lock is granted to a writer process.

19. The method of claim 1 further comprising maintaining a count of outstanding read locks for the data structure by processes that require continuous access to the data structure and have relinquished an acquired read lock prior to completing the process requiring continuous access to the data structure.

20. The method of claim 1 further comprising not issuing a write lock for the data structure if one or more read locks are outstanding for the data structure.

* * * * *

UNITED STATES PATENT AND TRADEMARK OFFICE
CERTIFICATE OF CORRECTION

| | | |
|---|---|---|
| PATENT NO. | : 8,312,194 B2 | Page 1 of 1 |
| APPLICATION NO. | : 11/240256 | |
| DATED | : November 13, 2012 | |
| INVENTOR(S) | : Eric C. Scoredos | |

It is certified that error appears in the above-identified patent and that said Letters Patent is hereby corrected as shown below:

In the Claims

In column 7, line 53, in Claim 13, delete "one of more" and insert -- one or more --, therefor.

In column 8, line 39, in Claim 18, delete "claim 7" and insert -- claim 13 --, therefor.

Signed and Sealed this
Sixth Day of May, 2014

Michelle K. Lee
*Deputy Director of the United States Patent and Trademark Office*